United States Patent
Post et al.

(10) Patent No.: US 8,468,799 B2
(45) Date of Patent: Jun. 25, 2013

(54) PROCEDURE AND DEVICE FOR CONTROLLING AN AIR SUPPLY SYSTEM OF A COMBUSTION ENGINE

(75) Inventors: Christian Post, Stuttgart (DE); Oliver Zink, Muggensturm (DE); Andreas Nagel, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 719 days.

(21) Appl. No.: 12/330,254

(22) Filed: Dec. 8, 2008

(65) Prior Publication Data

US 2009/0229586 A1 Sep. 17, 2009

(30) Foreign Application Priority Data

Mar. 14, 2008 (DE) .................. 10 2008 000 691

(51) Int. Cl.
*F01N 3/00* (2006.01)
*F01N 3/02* (2006.01)
(52) U.S. Cl.
USPC ................... 60/277; 60/274; 60/276; 60/297; 60/311
(58) Field of Classification Search
USPC ................... 60/274, 276, 277, 280, 285, 297, 60/311
See application file for complete search history.

(56) References Cited

U.S. PATENT DOCUMENTS

| | | | | |
|---|---|---|---|---|
| 5,617,722 A * | 4/1997 | Takaku | ............................ | 60/277 |
| 6,568,246 B1 * | 5/2003 | Ponagai et al. | ............ | 73/40.5 R |
| 6,574,956 B1 | 6/2003 | Moraal et al. | | |
| 6,594,987 B2 * | 7/2003 | Uranishi | ......................... | 60/277 |
| 6,684,869 B2 * | 2/2004 | Ponagai et al. | ............... | 123/680 |
| 7,139,658 B2 * | 11/2006 | Satoya | .......................... | 701/114 |
| 7,396,389 B2 * | 7/2008 | Kariya et al. | .................... | 95/273 |
| 2003/0106303 A1 | 6/2003 | Plote | | |
| 2004/0200271 A1 * | 10/2004 | van Nieuwstadt | ........... | 73/118.1 |
| 2005/0103002 A1 | 5/2005 | Kondou et al. | | |
| 2005/0188681 A1 | 9/2005 | Emi et al. | | |
| 2006/0005821 A1 * | 1/2006 | Osumi et al. | ................... | 123/674 |
| 2006/0117740 A1 | 6/2006 | Okugawa et al. | | |
| 2009/0013665 A1 * | 1/2009 | Brahma | ......................... | 60/276 |

FOREIGN PATENT DOCUMENTS

| | | |
|---|---|---|
| DE | 10 2004 048 135 | 4/2006 |
| DE | 10 2006 010 095 | 9/2007 |
| EP | 1 364 110 | 11/2003 |

* cited by examiner

*Primary Examiner* — Kenneth Bomberg
*Assistant Examiner* — Audrey K Bradley
(74) *Attorney, Agent, or Firm* — Merchant & Gould P.C.

(57) ABSTRACT

The invention concerns a procedure and a device for controlling an air supply system of a combustion engine with an exhaust gas system and an exhaust gas purification system with a particle filter in the exhaust gas system, whereby a boost pressure of an air supply current is controlled or can be controlled in the air supply system over a combustion air supply duct with the aid if a throttle valve and/or an exhaust gas recirculation between the exhaust gas system and the combustion air supply duct. Regarding the procedure it is provided according to the invention, that the air supply current is determined directly before or during a regeneration of the particle filter by different means with the aid of signals from measuring devices that are arranged in the air supply system and/or sensors that are arranged in the exhaust gas system and that the results are compared to each other. With the procedure and the device defects as leakages in the air supply system of the combustion engine can be diagnosed and thus the regeneration of the particle filter interrupted if necessary before it can be damaged by uncontrolled air infiltrations.

9 Claims, 1 Drawing Sheet

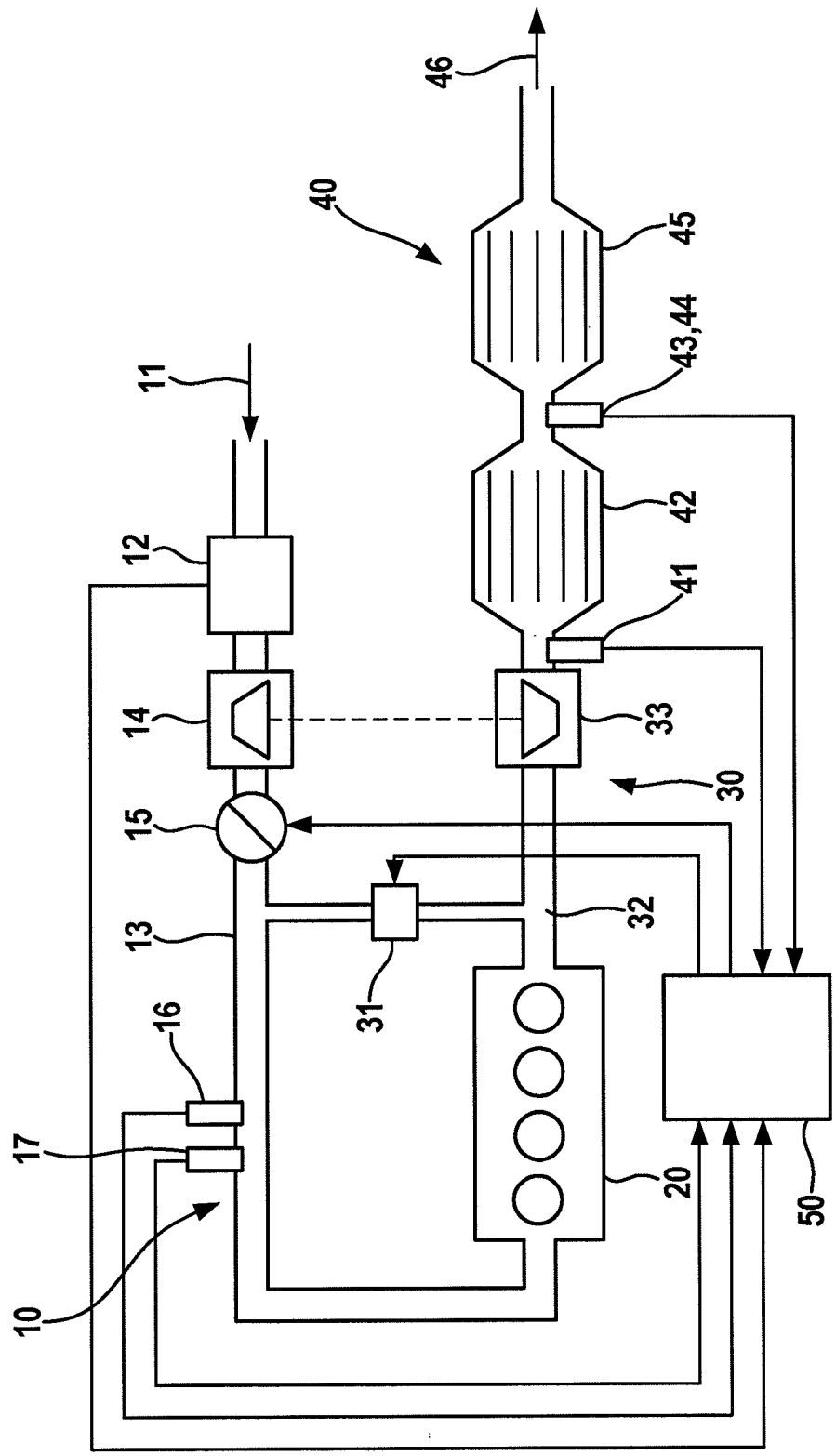

PROCEDURE AND DEVICE FOR CONTROLLING AN AIR SUPPLY SYSTEM OF A COMBUSTION ENGINE

TECHNICAL FIELD

The invention concerns a procedure for monitoring a supply air system of a combustion engine with an exhaust gas system and an exhaust gas purification system with a particle filter that exists in the exhaust gas system, whereby a boost pressure of a supply air current is controlled in the supply air system over a combustion air supply duct with the aid of a throttle valve and/or an exhaust gas recirculation between the exhaust gas system and the combustion air supply duct. The invention furthermore concerns a corresponding device.

BACKGROUND

Particle filters for eliminating soot particles from the exhaust gas, especially of diesel combustion engines, have been used for several years. The soot particles are thereby eliminated on a filter surface, partially also in a filter structure. Particle filters provide a limited storage capacity and have to be regenerated for fixing the purification efficiency. This takes place at diesel soot particle filters (DPF) by increasing the exhaust gas temperature up to typically 600° C. to 650° C. This can happen by measures in the mixture formation of the engine, for example by postponing the main injection or by dropping an after injection that combusts in an engine or by after motor operated measures, as for example dropping an after injection that combusts at an oxidization catalyst.

An exothermic reaction is triggered off, which causes a burn-up of the soot particles and which regenerates the particle filter within several minutes. An increased oxygen content in the exhaust gas speeds up the burn-up and causes a temperature rise, which can also concern only parts of the particle filter.

A reduced exhaust gas volume also causes a temperature rise in the particle filter and speeds up the burn-up, but it can also cause local excessive temperature increases. A high material load of the particle filter can develop if the exhaust gas volume is strikingly reduced during a running regeneration process or if a high oxygen content additionally occurs in the exhaust gas like when stopping at a traffic light after a preliminary fast drive. An increased oxygen content in the exhaust gas even occurs during boost operation. The high temperatures that occur during these critical operation statuses can damage cost efficient but thermally less resilient filter materials as sinter metal or cordierite and also catalytic layers of particle filters, which are designated to reduce the temperature that is required for a regeneration.

According to the state of the art the profile of the air supply duct is reduced for reducing the oxygen content in the exhaust gas with the aid of a throttle valve in the air supply duct of the combustion engine. But the throttle valve is not completely closed at the systems that are present on the market.

EP 1 364 110 B1 describes a procedure for avoiding the overheating of a particle filter, at which a parameter is determined from control parameters of the combustion engine and/or the exhaust gas after treatment system that allows statement about the expected intensity of the reaction in the exhaust gas after treatment system. If the parameter exceeds a default threshold, measures for reducing the intensity of the reaction are undertaken. Measures are a recirculation of the air supply amount and/or an additional admeasuring of fuel and/or an increase of an exhaust gas recirculation rate. It is mentioned that the throttle valve is closed or at least partially closed for reducing the air supply amount. But an advantageous order of these measures or a simultaneous closing of the throttle valve and opening of the exhaust gas recirculation are not described.

It is known from DE 10 2004 048 135 that in order to speed up the burn-up at the regeneration of a particle filter oxygen has to be added to the exhaust gas and in order to slow down the burn-up nitrogen has to be added. The oxygen and the nitrogen are produced from the ambient air with the aid of an air decomposition device as for example a membrane that is permeable for oxygen molecules. In a compression step the supply air has thus to be brought to a gas pressure that is necessary for a sufficient passage amount. This requires an additional energy consumption, which works against an economical operation of the combustion engine.

DE 10 2006 010 095 A1 describes a procedure and a device for controlling a regeneration of a particle filter in an exhaust gas after treatment device of a combustion engine, whereby combustion supply air is added over a combustion air supply duct with a throttle valve and whereby exhaust gas is reduced over an exhaust gas recirculation and or a low pressure exhaust gas recirculation, over which exhaust gas can be added to the combustion air supply duct. It is provided according to the invention that the intervention of the throttle valve and the exhaust gas recirculation and/or the low pressure exhaust gas recirculation are undertaken in a default order. Hereby it can be achieved, that the particle filter is protected from damages by overheating and that simultaneously the driving comfort is not affected. By closing the throttle valve a low intake pressure of the combustion engine is caused, which is balanced opening the exhaust gas recirculation. It can especially be achieved by a default order of the intervention at the throttle valve and the exhaust gas recirculation that the intervention takes place torque-neutral and also acoustically imperceptible. The controlling of the regeneration process of the particle filter that is enabled by this procedure allows the use of economic materials for the particle filter such as sinter metal and cordierite.

It is especially important for thermally critical filter materials at all pre-described measures, that the temperature before the particle filter is set very accurately and that an oxygen concentration that is accommodated to the soot treatment is provided in the exhaust gas. Currently an oxygen limitation is only possible with a combination of the injection sided measures as well as interventions in the air supply system, for example by a strong throttling. If it comes to a leakage in the air supply system during this phase that has not been diagnosed so far, this can cause the destruction of the particle filter during a particle filter regeneration.

Therefore it is the task of the invention to provide a procedure for controlling the air supply system of the combustion engine, which especially has the ability to provide a diagnosis of the air supply system regarding possible defects before and after the critical particle filter regeneration. It is furthermore a task of the invention to provide a corresponding device.

SUMMARY

The task that concerns the invention is solved thereby solved, in that the air supply current is determined in different ways directly before or during a regeneration of the particle filter with the aid of signals by measuring devices that are present in the air supply system and/or sensors that are present in the exhaust gas system and in that the results are compared to each other. Thereby a reasonability test of the air supply current can be undertaken, whereby especially leakages in the air supply system of the combustion engine can be diagnosed.

Thus small leakages for example in the inlet manifold can be detected, which are not detected so far during normal operation, since this would only cause a light air loss (discharge) due to the overpressure in this operation status, when the load pressure is regulated nevertheless. In a highly throttled operation on the other side, as it especially occurs during a thermally critical particle filter regeneration and during which a rest pressure of only 500 mbar can be present in the inlet manifold, air would be sucked in the case of a defect. By an above mentioned comparison from the deviations in the measured values a fast diagnosis of possibly occurring leakages can be undertaken.

If significant deviations in the results occur, the sequence control system can be interfered, as it is provided in a preferred procedure alternative, for the regeneration of the particle filter, so that a thermal overuse of the particle filter by an oxygen oversupply can be avoided. Especially thermally less resilient filter materials require an application at their regeneration, at which an accurate air/fuel regulation takes place and where a specific oxygen limit is not exceeded.

One measure provides that the intervention in the sequence control system of the regeneration takes place in such a way, that the regeneration of the particle filter is interrupted. Thereby an overheating of the filter material can be avoided, which would otherwise cause the destruction of the particle filter.

Additionally it can be provided that an error is set in a superior engine control, so that for example a warning lamp is controlled, which signalizes the driver of the motor vehicle, that a failure occurred (for example a yellow engine warning light). Furthermore also other control and regulation processes in the engine control can be influenced by this error, as for example fuel mixture formation, injection behavior etc.

One example of the procedure provides that a reasonability test of the air supply current is undertaken by calculating the air supply current on the one hand from an injection amount, which is deduced from a control unit for the fuel injection, and from a lambda value of an exhaust gas probe in an exhaust gas duct of an exhaust gas system, and on the other hand from signals of an air measurement system in the air supply system. A direct comparison of the air mass flow rate that have been determined this way provides indications, about whether a leakage must exist in the air supply system.

An alternative method provides, that a reasonability test of the air supply current is undertaken by calculating the air supply current on the one hand from the boost pressure and a temperature in the combustion air supply duct and on the other hand from signals of the air measurement system in the air supply system. Thus an air mass flow rate can be calculated from the boost pressure signal and the temperature by using the general exhaust emission regulations, which has to be compared to the value for the air supply current from the air measuring system. If the value of the temperature and the boost pressure deviates progressively from the value of the air measurement system, external air has to influx additionally into the air supply system, which can indicate a defect.

In preferred alternatives of the procedure the air supply current in the air measurement system is determined by a hot film air mass sensor (HFM). These are already used in modern combustion engines on the supply air side for an optimal mixture formation in connection with a pollutant reduction lambda regulation and distinguish themselves by a high accuracy.

It shall be understood that one or the other method as well as a combination of several methods can be used.

A preferred use of at least one previously described alternative of the procedure provides the use at diesel combustion engines with thermally critical particle filter material, which can be efficiently protected during the regeneration phase from uncontrolled air infiltrations or a harmful oversupply of oxygen.

The problem that concerns the device is thereby solved, in that the combustion engine provides a diagnostic unit, which is connected to measuring devices on the input side that are present on the motor side and to additional sensors in the combustion air supply duct, and in that it provides devices, which are build for implementing at least one of the previously described alternatives of the procedure.

A preferred sensor configuration provides thereby that the diagnostic unit is connected on the input side with an air measurement system in the air supply system, a control unit for the fuel injection, a pressure sensor and a temperature sensor in the combustion air supply duct and/or with a lambda probe in an exhaust gas duct of the exhaust gas system, whereby different reasonability tests can be undertaken. A pressure sensor is usually present for regulating the boost pressure at turbo charged combustion engines.

For regenerating the particle filter sequence control systems are provided for example as DE 10 2006 010 095 A1 describes it. Thereby it is advantageous when the diagnostic unit is in operative connection with such a sequence control system for regenerating the particle filter, so that applicable interventions can take place, which reduce the burden of the particle filter.

A preferred embodiment provides, that the diagnosis unit is part of a superior electronic diesel control unit (electronic diesel control—EDC), with which the fuel injection as well as other engine functions can be regulated or controlled. In such EDC-units for example the injection amounts are regulated amongst others or provided for the injection valves. Therefore these signals can be directly used for diagnosing as previously described. Such EDC-units have furthermore a number of diagnosis modules and corresponding diagnosis interfaces, which can be used for controlling the air supply system. The sequence control system for a particle filter regeneration is usually also realized as a program run in such EDC-units, so that measures can be directly undertaking when diagnosing a leakage in the air supply system.

BRIEF DESCRIPTION OF THE DRAWINGS

The invention is further explained by the embodiment that is shown in FIG. 1.

FIG. 1 schematically shows a combustion engine with an exhaust gas purification system.

DETAILED DESCRIPTION

FIG. 1 shows the technical surrounding that is known for example from DE 10 2006 010095 A1, in which the procedure according to the invention can be used. The air supply system 10 of a combustion engine 20 is shown, especially of a diesel combustion engine, which provides an exhaust gas purification system 40 in its exhaust gas system 30.

The air supply system 10 basically consists of a combustion air supply duct 13, which provides an air measurement system 12 in the flow direction of an air supply current 11, a compression step 14 and a throttle valve 15, which bring the air supply current 11 with regard to the amount and boost pressure on to a desired value for a current operating point of the combustion engine 20.

The air measurement system 12 consist in the shown example of a hot film air mass sensor (HFM), which delivers corresponding data about the current air mass to a diagnostic unit 50 according to the invention. The diagnostic unit 50 is part of an electronic diesel control unit (EDC-unit) in the shown embodiment, which can also contain diverse diagnostic functions besides the controlling of the injection amount for the diesel fuel. Such an EDC-unit provides the essential centerpiece of a modern low-emission diesel engine. The hot film air mass sensors (HFM) are part of a modern injection regulation (for example LH-JETRONIC) and are already described in detail by the literature.

Furthermore there is at least one pressure sensor 16 and one temperature sensor 17 arranged in the combustion air supply duct 13, which also provide corresponding signals to the diagnostic unit 50. Combined pressure and temperature sensors are also imaginable.

An exhaust gas recirculation 31 is arranged between an exhaust gas duct 32 of the exhaust gas system 30 and the combustion air supply duct 13. The throttle valve 15 and the exhaust gas recirculation 31 are controlled in the shown example by the diagnostic unit 50, in which a sequence control system is integrated. It is self-evident that the diagnostic unit 50 and the sequence control system of the particle filter regeneration can be an integral component of the EDC-unit.

An exhaust gas turbine 33 is arranged in the exhaust gas duct 32 of the combustion engine 20, which is mechanically linked to the compression step 14 and which builds with it an exhaust gas turbo charger.

The exhaust gas purification system 40 that is provided with an oxidation catalyst 42 and a particle filter 45, which purify an exhaust gas stream 46, is subordinate to the exhaust gas turbine 33 in the exhaust gas duct 32. A temperature sensor 41 is provided in the direction of the current of the exhaust gas stream 46 before the oxidation catalyst 42, with which the exhaust gas temperature can be controlled. A lambda probe 43 is arranged between the oxidation catalyst 42 and the particle filter 45 for determining a lambda value, as well as another temperature sensor 44. The temperature sensors 41, 44 as well as the lambda probe 43 deliver their signals to the diagnostic unit 50.

According to the invention it is provided before or during a particle filter regeneration, that the air supply current is determined for example with the aid of the injection amount, which is deduced from the EDC-unit, and the aid of a lambda value of the lambda probe 43 in the exhaust gas duct 32 of the exhaust gas system 30 on the one hand and from signals of the hot film air mass sensor (HFM) in the air measurement system 12 on the other hand, and that both results are compared to each other. If they significantly deviate from each other, this indicates a leakage in the air supply system 10. Then corresponding safety measures, as previously described, can be undertaken, which can even cause an interruption of the particle filter regeneration.

Thereby an alternative of the procedure takes advantage of the fact, that a reasonability test of the air supply current 11 is undertaken by calculating the air supply current 11 on the one hand from the boost pressure and the temperature in the combustion air supply duct 13 and on the other hand from signals of the hot film air mass sensor (HFM) in the air measurement system 12 of the air supply system 10. The pressure sensor 16 as well as the temperature sensor 17 in the combustion air supply duct 13 serve for determining the boost pressure and the temperature.

Defects, as leakages in the air supply system of the combustion engine can be diagnosed with the procedure and the device and the regeneration of the particle filter interrupted if necessary, before it can be damaged by uncontrolled air infiltrations.

The invention claimed is:

1. A method of controlling an air supply system of a combustion engine, wherein an exhaust gas system arranged in the combustion engine includes an exhaust gas purification system with a particle filter, the method comprising:
controlling a boost pressure of an air supply current in a combustion air supply duct via at least one of:
a throttle valve; and
an exhaust gas recirculation arranged between the exhaust gas system and the combustion air supply duct;
evaluating the air supply current at one of:
directly prior to a regeneration phase of the particle filter; and
during the regeneration phase of the particle filter;
wherein the air supply current is evaluated via :
at least one signal of at least one measuring device arranged in the air supply system; and
at least one signal of at least one measuring device arranged in the exhaust gas system;
comparing a first result of the evaluation of the at least one signal of the at least one measuring device arranged in the air supply system and a second result of the evaluation of the at least one signal of the at least one measuring device arranged in the exhaust gas system;
intervening a sequence control system for the regeneration of the particle filter upon a significant deviation of the first and second result; and
performing a reasonability test of the air supply current via:
calculating the air supply current by an injection amount, wherein the injection amount is deduced from a control unit for the fuel injection and from a lambda value of a lambda probe in an exhaust gas duct of the exhaust gas system; and
calculating the air supply current from at least one signal of an air measurement system arranged in the air supply system.

2. The method according to claim 1, further comprising calculating the air supply current in the air measurement system with the aid of a hot film air mass sensor.

3. The method according to claim 1, wherein the combustion engine is a diesel combustion engine, and wherein the filter includes a thermally critical particle filter material.

4. The method according to claim 1, further comprising interrupting the intervention of the sequence control system of the regeneration of the particle filter.

5. The method according to claim 4, further comprising setting an error input in a superior engine controlling.

6. A device for the implementation of a method of controlling an air supply system of a combustion engine, wherein an exhaust gas system arranged in the combustion engine includes an exhaust gas purification system with a particle filter, the method comprising: controlling a boost pressure of an air supply current in a combustion air supply duct via at least one of: a throttle valve; and an exhaust gas recirculation arranged between the exhaust gas system and the combustion air supply duct; evaluating the air supply current at one of: directly prior to a regeneration phase of the particle filter; and during the regeneration phase of the particle filter; wherein the air supply current is evaluated via: at least one signal of at least one measuring device arranged in the air supply system; and at least one signal of at least one measuring device arranged in the exhaust gas system; comparing a first result of the evaluation of the at least one signal of the at least one measuring device arranged in the air supply system and a second result of the evaluation of the at least one signal of the at least one measuring device arranged in the exhaust gas system; intervening a sequence control system for the regeneration of the particle filter upon a significant deviation of the first and second result, and wherein the combustion engine includes a diagnostic unit that is connected on an input side, and wherein one or more measuring devices are present on a motor side, and wherein a plurality of additional sensors are positioned in the combustion air supply duct; and performing a reasonability test of the air supply current via: calculating the air supply current by an injection amount, wherein the injection amount is deduced from a control unit for the fuel injection and from a lambda value of a lambda probe in an exhaust gas duct of the exhaust gas system; and calculating the air supply current from at least one signal of an air measurement system arranged in the air supply system.

7. The device according to claim 6, wherein the diagnostic unit is part of a superior electronic diesel control unit, wherein the superior electronic diesel control unit at least one of controls and regulates fuel injection and other engine functions.

8. The device of claim 6, wherein the diagnostic unit is connected on an input side with one or more from the following list including:
   the air measurement system in the air supply system;
   a control unit for the fuel injection;
   a pressure sensor;
   a temperature sensor in the combustion air supply duct; and
   a lambda probe in an exhaust gas duct of the exhaust gas system.

9. The device of claim 8, wherein the diagnostic unit is in operating connection with a sequence control system for regenerating the particle filter.

* * * * *